(12) United States Patent
Halladay

(10) Patent No.: US 11,113,429 B2
(45) Date of Patent: Sep. 7, 2021

(54) SOLID STATE STORAGE DATA DESTRUCTION

(71) Applicant: JPMorgan Chase Bank, N.A., New York, NY (US)

(72) Inventor: Trevis A. Halladay, Wesley Chapel, FL (US)

(73) Assignee: JPMORGAN CHASE BANK, N.A., New York, NY (US)

( * ) Notice: Subject to any disclaimer, the term of this patent is extended or adjusted under 35 U.S.C. 154(b) by 298 days.

(21) Appl. No.: 16/285,514

(22) Filed: Feb. 26, 2019

(65) Prior Publication Data

US 2019/0266361 A1    Aug. 29, 2019

Related U.S. Application Data

(60) Provisional application No. 62/635,172, filed on Feb. 26, 2018.

(51) Int. Cl.
| | |
|---|---|
| *G06F 21/88* | (2013.01) |
| *G06F 21/86* | (2013.01) |
| *G06F 21/60* | (2013.01) |
| *H05B 6/36* | (2006.01) |
| *H05B 6/06* | (2006.01) |
| *G06F 21/78* | (2013.01) |

(52) U.S. Cl.
CPC ............. *G06F 21/88* (2013.01); *G06F 21/60* (2013.01); *G06F 21/78* (2013.01); *G06F 21/86* (2013.01); *H05B 6/06* (2013.01); *H05B 6/362* (2013.01); *G06F 2221/2143* (2013.01)

(58) Field of Classification Search
CPC .......... G06F 21/88; G06F 21/78; G06F 21/86; G06F 21/60; G06F 2221/2143; H05B 6/362; H05B 6/06; H05B 6/10
See application file for complete search history.

(56) References Cited

U.S. PATENT DOCUMENTS

| | | | |
|---|---|---|---|
| 10,534,937 B2 * | 1/2020 | Rooyakkers | G06F 21/85 |
| 2008/0219122 A1 * | 9/2008 | Detzler | G06F 21/60 369/83 |

(Continued)

OTHER PUBLICATIONS

"Vanish: Increasing Data Privacy with Self-Destruction Data"— Geambasu et al, University of Washington, 18th Usenix Security Symposium, Usenix Association, Aug. 10, 2009 https://www.usenix.org/legacy/events/sec09/tech/full_papers/sec09_crypto.pdf (Year: 2009).*

(Continued)

*Primary Examiner* — Randy A Scott
(74) *Attorney, Agent, or Firm* — Greenblum & Bernstein, P.L.C.

(57) ABSTRACT

A system and method of permanently erasing the contents of a Solid-State Drive (SSD) which involves the destruction of the storage portion of the SSD by rapidly heating that portion of the SSD to a state at which the semiconductor devices which make up the SSD are destroyed or damaged. The system and method allows a user to locally or remotely erase a SSD drive to prevent the contents of the drive from being compromised. Certain embodiments of the system and method provide for the automatic destruction of the SSD should the device be connected to an unregistered drive controller.

20 Claims, 4 Drawing Sheets

(56) References Cited

U.S. PATENT DOCUMENTS

2010/0064371 A1* 3/2010 Mostovych ............ G06F 21/86
726/26
2016/0110567 A1* 4/2016 Rooyakkers ............ G06F 21/86
726/34

OTHER PUBLICATIONS

"Technique Triggers Electronic Circuits to Self-Destruct"—The Engineer, Jan. 26, 2018 https://www.theengineer.co.uk/electronic-circuits-self-destruct/ (Year: 2018).*

* cited by examiner

SOLID STATE STORAGE DATA DESTRUCTION

CROSS-REFERENCE TO RELATED APPLICATIONS

This application claims priority to and any benefit of U.S. Provisional Patent Application No. 62/635,172, filed on Feb. 26, 2018, the content of which is incorporated herein by reference in its entirety.

FIELD

The present disclosure relates generally to systems and methods for destroying or otherwise rendering a solid-state storage device unusable and its data permanently unrecoverable.

BACKGROUND

Portable computing devices, such as smartphones, tablet computers, and laptop computers (and even some less portable devices, such as, but not limited to, enterprise servers, network appliances, and desktop computers) are incorporating solid-state storage devices in place of conventional rotating disk drives. These solid-state storage devices can include various permanent and semi-permanent storage devices including, but not limited to such electronic devices as, electrically erasable programmable read-only memory (EEPROMs), flash memory, and solid-state drives (SSDs). This trend is likely to accelerate as the cost of solid-state storage continues to fall while their capacity increases. SSDs in particular have many advantages over rotating disk drives including decreased susceptibility to physical shock damage, no rotating or otherwise mechanical devices to wear out or replace, reduced power requirements, greater data storage and retrieval speeds, and smaller size.

Particularly in the case of portable devices, it is often desirable to be able to completely erase data stored on the device, such as when a device has been lost or stolen. In such cases, any type of remote deletion of data is limited and can result in the possibility that some data is recoverable. Physical destruction of memory components remains the most reliable method to ensure that sensitive data is not recoverable from the device. With conventional rotating disk drives, the data contained on the drive can be erased by exposure to a strong magnetic field. However, solid-state drives are resistant to magnetic fields and as such, are not easily and reliably erased by such methods. Alternately, the disk or disks that make up the data storage component of a conventional rotating disk drive can be physically destroyed, for example by crushing, grinding, or shredding the platters of the drive. SSDs are unfortunately not as easily erased. Because of their size, SSDs are frequently incorporated deeply into the structure of portable electronic devices. This makes it difficult, if not impossible, to physically destroy the SSD without also completely destroying the portable electronic device. And in some situations, data on an SSD may even survive a physical destruction attempt. Additionally, in the case of stolen or lost devices, physical access is not available.

Therefore it is appreciated that a need exists for systems and methods for reliably destroying the data found on a SSD device without having to completely destroy the computing device associated with the SSD device.

SUMMARY

In some embodiments, an induction coil is positioned such that an energy pulse applied to the coil causes electronic components of a solid-state drive (SSD) to heat to a temperature sufficient to cause components within the device to melt or fracture, physically destroying the device's operating capability. Thus, heating the SSD causes data stored on the SSD to be permanently lost and render the SSD permanently inoperable. A capacitor or other energy storage device may be electrically connected to the induction coil. Such a capacitor or other energy storage device can be selected such that it provides enough energy to the induction coil to cause the coil to heat to a temperature sufficient to destroy or damage the SSD.

In an exemplary embodiment, a solid-state drive (SSD) destruction system is provided. The system comprises an induction coil proximate to a SSD; and energy storage device; a switch device operably connected to the induction coil and the energy storage device; and, a controller in communication with the switch device, wherein the controller is configured to control the switch device to regulate energy discharged from the energy storage device into the induction coil such that heat generated by the discharged energy is sufficient to destroy data stored in the SSD.

In another embodiment, a method for automatically destroying a SSD is provided. The method comprises: receiving a SSD destruction command; determining a charge level of an energy storage device; and, operating a switch device to regulate energy discharge from the energy storage device to an induction coil proximate to a SSD, such that the heat generated by the energy discharge is sufficient to destroy data stored in the SSD.

In yet another embodiment, a SSD destruction system is provided. The system comprises: an induction coil proximate to a SSD, the SSD having an enclosure and an enclosure intrusion detection device; an energy storage device; a switch device operably connected to the induction coil and the energy storage device; and, a controller in communication with enclosure intrusion detection device and the switch device, wherein when the enclosure intrusion detection device detects an intrusion of the SSD enclosure, the controller is configured to control the switch device to regulate energy discharged from the energy storage device into the induction coil such that heat generated by the discharged energy is sufficient to destroy data stored in the SSD.

The above and other aspects and advantages of the present disclosure will become more readily apparent from the following detailed description and illustrative embodiments thereof, which is to be read in connection with the accompanying drawings.

BRIEF DESCRIPTION OF THE DRAWINGS

These and other features of the general inventive concept will become better understood with regard to the following description and accompanying drawings in which.

DETAILED DESCRIPTION

Aspects and implementations of the present disclosure will be understood more fully from the detailed description given below and from the accompanying drawings of the various aspects and implementations of the disclosure. This should not be taken to limit the disclosure to specific aspects or implementations, but explanation and understanding only.

Figure 1:
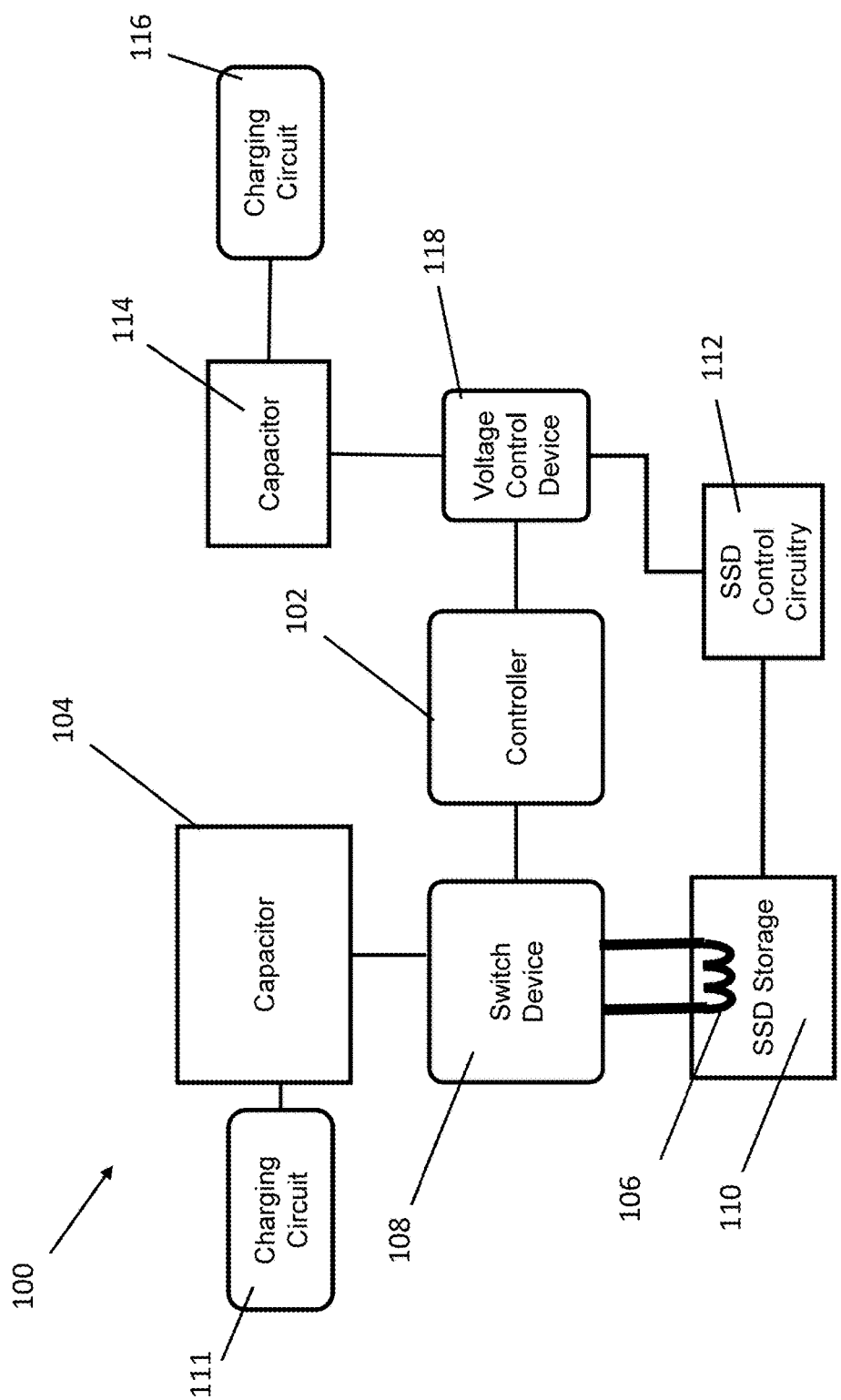
FIG. 1 is a system diagram illustrating an exemplary SSD destruction system.

With reference to FIG. 1, a SSD destruction system 100 may comprise a controller 102, a capacitor 104 or other energy storage device, and an induction or heating coil 106, e.g. a flat plane induction coil. The SSD destruction system 100 is associated with a SSD storage 110 which may need to be destroyed. In certain embodiments the SSD destruction system 100 may be integrated with the SSD components, e.g. soldered or otherwise affixed to a SSD circuit board. The controller 102 may be in electronic communication with a switch device 108 that functions as a switch. The switch device 108 may be located in a circuit formed by the capacitor 104 and coil 106. The capacitor 104 may be any capacitor or similar energy storage device, e.g a battery. In some embodiments more than one capacitor 104 may be used. It is preferable that capacitor 104 be non-flammable and sufficiently large enough to provide the energy needed to destroy the SSD storage 110 and robust enough to avoid overheating and catching fire in such a way as to injure the user or unnecessarily damage the computer or other device in which the SSD storage 110 is enclosed. For example, in certain embodiments, capacitor 104 may be a 1000 µF capacitor. It will be appreciated that various capacitor form factors may be used to accommodate the physical size of the SSD storage 110 or any associated housing. In some embodiments, the capacitance value of a capacitor 104 may range from a small value such as 10 µF up to, and exceeding, 9800 µF. In certain embodiments, the capacitor 104 may be charged by a charging circuit 111. Charging circuit 111 may be configured to provide an electric charge to the capacitor 104. Once charged, the SSD destruction system 100 is ready for use. In some exemplary embodiments, a rechargeable battery may be used instead of or in combination with one or more capacitors. It will be appreciated that the capacitor 104 may be sized and additional protection components employed (for example, thermally operated circuit interruption devices) such that once destroyed, SSD components will not overheat and cause damage to the computer or other device in which the SSD storage 110 is enclosed.

During normal operation, the switch device 108 functions like an open switch and does not conduct current from the capacitor 104 to the coil 106. However, when the controller 102 determines that a condition has occurred which necessitates the destruction or erasure of the SSD data, the controller 102 causes the switch device 108 to allow the capacitor 104 to rapidly discharge into the coil 106. This discharge may also be referred to herein as an energy pulse. The discharge or pulse allows for a rapid localized heating at the SSD storage 110 which prevents damage to components not related to the SSD storage 110. Depending upon the configuration of the SSD storage 110, the coil 106 can inductively or resistively heat the SSD storage 110 to the point that it becomes amorphous. In certain embodiments, heat from the coil 106 may cause the SSD storage 110 to fracture or crack, similarly rendering the SSD storage 110 permanently inoperable and the data stored thereon unrecoverable. Transition to the amorphous state destroys any data stored by the SSD storage 110. One of ordinary skill in the art will appreciate that the sizing of coil 106 and capacitor 104 is dependent upon the configuration of the SSD storage device 110. In some exemplary embodiments, a capacitor in the range of 470 µF is used. However, larger or smaller sizes may be used depending upon the circuitry of the SSD storage device 110. It will be appreciated that the coil 106 is proximate to the SSD storage device 110, and in some embodiments, may be in direct contact with the SSD storage device 110.

In some embodiments, a device, including, for example, a controller 102 may be configured to monitor the charge level of the capacitor 104 and verify that the charge on the capacitor 104 is sufficient to reliably destroy the SSD storage 110. If the level of charge detected is too low, the controller 102 may cause the charging circuit 111 to provide a charge level to the capacitor 104 that is sufficient to destroy the SSD storage 110 before the switch device 108 is instructed to close.

In certain exemplary embodiments, it may be desirable to also disable or destroy the SSD control circuitry 112 associated with the SSD storage 110. SSD control circuitry 112 may comprise additional electronic components related to the operation of the SSD. Destroying these components would further limit any use of the SSD. In such an embodiment, a second capacitor 114 may be charged by a second charging circuit 116. The second capacitor 114 may be connected to the SSD control circuitry 112 such that when a voltage control device 118, for example a switch, is caused to close or activate by the controller 102, the energy stored in the second capacitor 114 discharges into the control circuitry 112 and destroys and/or renders inoperable the control functions of control circuitry 112. In certain embodiments, the control circuitry is destroyed via a voltage overload at the control circuitry 112. In some embodiments, the voltage control device 118 is a second switch, that when closed, allows for the discharge of energy from the second capacitor 114 to the SSD control circuitry 112 or an induction coil proximate to the SSD control circuitry 112. Certain exemplary embodiments may combine certain portions of these components. For example, an exemplary embodiment may use a single capacitor and charging circuit for both the SSD and control circuit destruction. In some embodiments, SSD control circuitry 112 may comprise the controller 102. In such embodiments, destruction of the SSD storage 110 and SSD control circuitry 112 must be accomplished sequentially, with the SSD storage 110 destroyed first and the SSD control circuitry 112 destroyed second. This is because, in such an embodiment, the destruction of SSD storage 110 is dependent on proper operation of the controller 102 and SSD control circuitry 112.

In certain embodiments, a voltage higher than would normally be supplied to semiconductor devices, e.g. those which control read/write access to a SSD, may be discharged from a capacitor or other energy storage device into the semiconductor devices. Thermal protection devices may be employed in such embodiments to limit the electrical current provided to the semiconductor devices after the higher than normal voltage is discharged in order to prevent damage to the device in which the SSD is deployed. The capacitor is selected such that it can supply a voltage with sufficient current available (an energy pulse) to cause the semiconductors to be damaged or destroyed. Other devices that may store the energy for the pulse include batteries (including rechargeable), supercapacitors, etc.

In some embodiments, SSD destruction system 100 may be configured to destroy a plurality of SSD devices using a large induction coil 106 operable to reach a high enough temperature to destroy the plurality of SSD devices at once. For example, a plurality of SSD devices may be positioned proximate to the large induction coil and sufficient heat applied for a predetermined duration, e.g. 200° Fahrenheit for 5 seconds, capable to destroy the data on the SSD devices.

Figure 2:
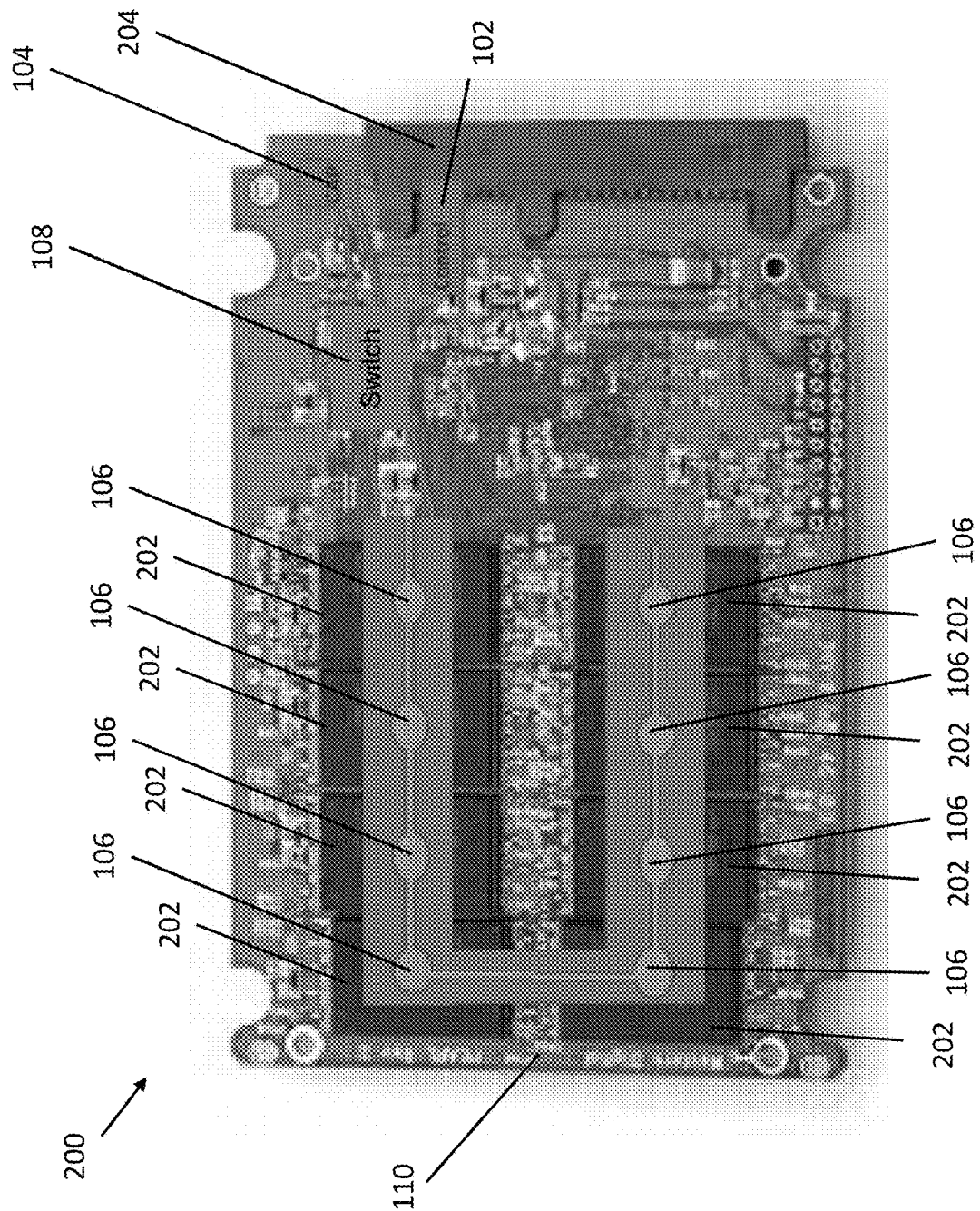
FIG. 2 is an illustration of a SSD comprising an exemplary SSD destruction system.

FIG. 2 illustrates an exemplary circuit board 200 with a plurality of integrated circuits (e.g. NAND chips) 202 that together comprise a SSD storage 110. A connector 204 may be configured such that the circuit board 200 can be connected to a larger circuit board, e.g. a motherboard (not shown) which comprises SSD control circuitry 112. In certain embodiments, SSD control circuitry 112 may be located on the circuit board 200. As illustrated, a coil 106 is located at each integrated circuit 202. It will be appreciated that the plurality of coils 106 may be connected such that energy may flow from the capacitor 104 through each coil 106 and generate a substantially similar heating pattern at each coil 106. A capacitor 104 is connected to the coils 106 through the switch device 108. To initiate the destruction of the SSD storage 110, the controller 102 may provide a signal to the switch device 108. As is shown, the coils 106 are located such that they are proximate to the integrated circuit 202 in order to provide the inductive heating required to cause the integrated circuit 202 substrate to become amorphous or cause the chip embodying the integrated circuit 202 to fracture or crack. In other exemplary embodiments, the coils 106 could be located under the integrated circuit 202 or could be formed integrally with the chips in order to position the inductive coil 106 more closely to the substrate.

Figure 3:
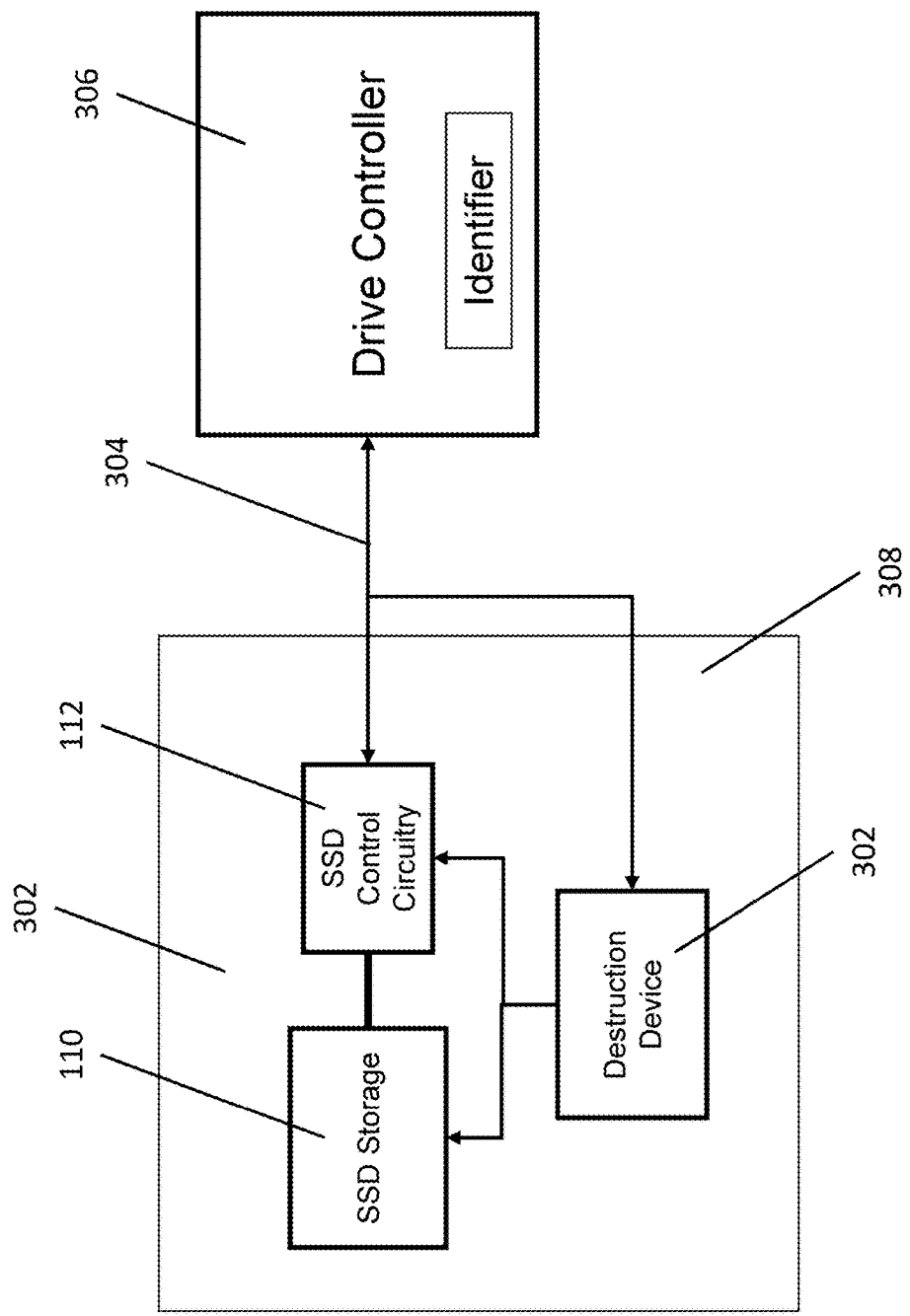
FIG. 3 is a block diagram of an SSD which comprises an exemplary embodiment of a SSD destruction system in communication with a drive controller.

In some exemplary embodiments, the storage component of the SSD is paired with a particular drive controller. Any attempt to access the drive from another controller would result in the destruction of the protected SSD. An illustration of such an embodiment is illustrated in FIG. 3. As shown, a SSD storage 110 is in communication with a SSD control circuitry 112. Both the SSD storage 110 and the SSD control circuitry 112 are connected to the SSD destruction system 302 which has access to the communication bus 304 between the SSD control circuitry 112 and a drive controller 306. In an exemplary embodiment, the drive controller 306 and SSD drive assembly 308 are both serialized with unique identifiers. Software instructions are executed by the controller (not shown) of the SSD destruction system 302 which stores an association between the SSD drive assembly 308 and drive controller 306. If the drive assembly 308 is connected to a drive controller 306 with a different identifier, the controller 102 identifies that the drive controller 306 is not correct and causes the SSD destruction system 302 to destroy the contents of the SSD drive assembly 308. In this manner, attempts to access data on a SSD drive assembly 308 by an unauthorized controller 306 is prevented.

In certain operating environments, there are circumstances in which it may be desirable to change the security configuration of a SSD drive assembly 308. In some embodiments, encrypted keys, e.g. issuer-subscriber keys, blockchain keys, etc., may be used to enable later changes to the configuration of the controller which regulates the destruction of the SSD storage 110. These keys may be generated during the setup and configuration of a SSD drive assembly 308 and can be registered with a centralized command-and-control storage vault. As was noted above, in certain embodiments, the SSD drive assembly 308 may be paired to a specific drive controller 306. Should an authorized user wish to change this pairing, that user may be provided with the key from the centralized command-and-control vault. This encrypted key is provided to the SSD drive assembly 308 which decrypts the key and applies it to the SSD destruction system 302 to enable a new pairing to take place. This allows for SSD drive assembly 308 to be connected to a different drive controller 306 when such a connection is authorized.

Figure 4:
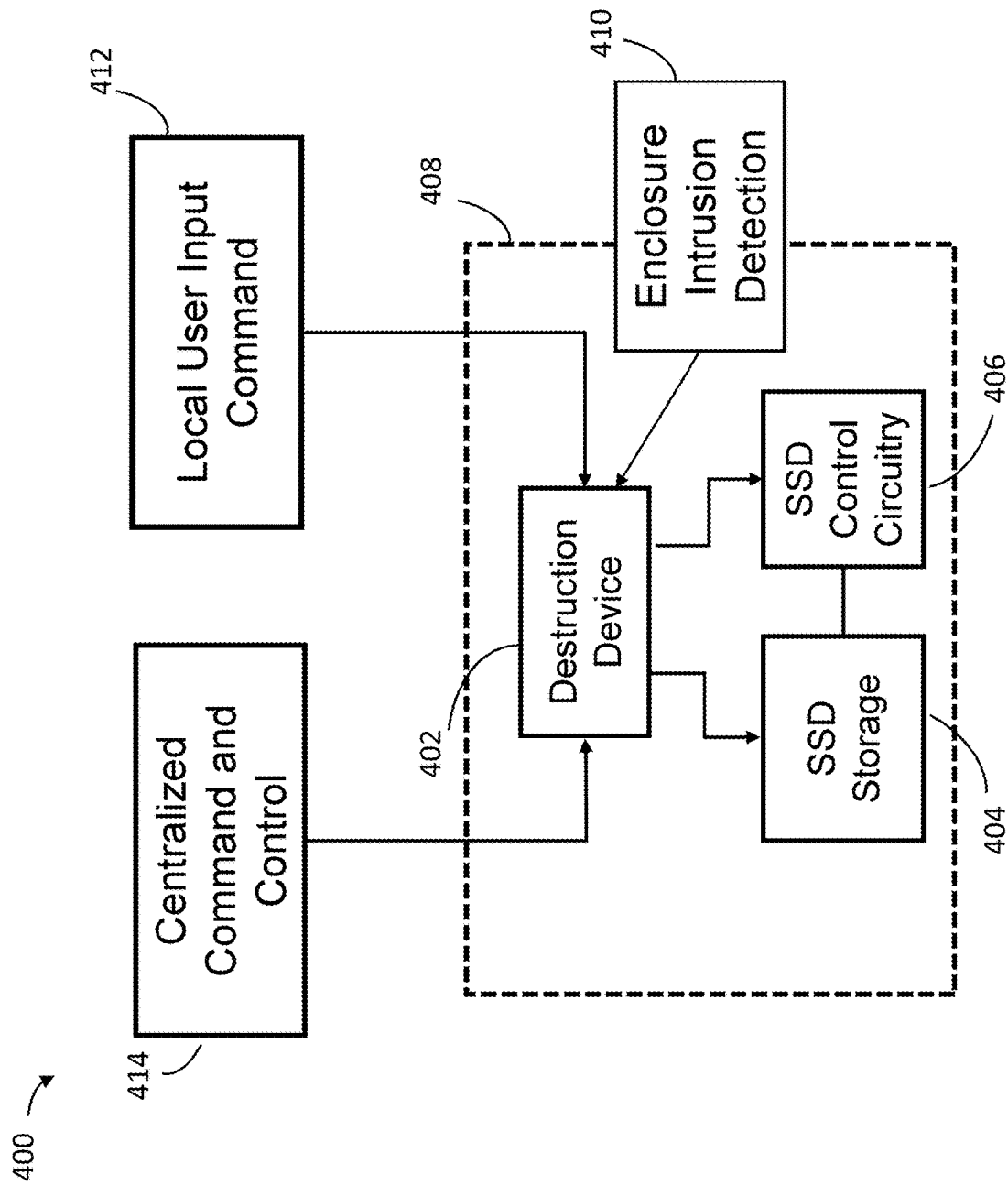
FIG. 4 is a block diagram of an exemplary embodiment illustrating certain methods of initiating the destruction of a SSD

FIG. 4 shows a block diagram 400 illustrating various initiation mechanisms related to the SSD destruction systems and methods as disclosed herein. An exemplary SSD destruction device 402 may be configured to destroy the SSD storage 404 and/or the SSD control circuitry 406, consistent with methods and systems as taught by the present disclosure. In certain embodiments, the SSD destruction device 402, the SSD storage 404, and the SSD control circuitry 406 may be associated with an SSD assembly having a SSD housing 408. In some embodiments, the housing 408 is configured to automatically detect intrusion or modification attempts via an enclosure intrusion detection module 410. The intrusion detection module 410 may comprise a series of sensors configured to recognize when the housing 408 is being opened or accessed, and send an initiation signal to the SSD destruction device 402 to destroy the SSD storage 404 and/or the SSD control circuitry 406. Triggering automatic destruction of these components based on a detected intrusion of the housing 408 can prevent unauthorized modification or disablement of the SSD destruction device 402.

The destruction of the SSD storage 404 and/or the SSD control circuitry 406 can also be initiated on demand, e.g. via a local user input command 412. A user may issue a command to destroy the SSD storage 404 and/or the SSD control circuitry 406 from a keyboard or other input method. This can be performed using a combination of keys, similar to the "Ctrl-Alt-Delete" combination that is familiar to many computer users. As one of ordinary skill in the art will recognize, such a combination must be one that cannot easily be accidentally performed as the result is not only permanently lost data, but also the likely destruction the SSD storage 404 and/or the SSD control circuitry 406, resulting in an expensive replacement. Because of the permanence of the result, certain exemplary embodiments may require not only a keyboard input, but the entry of a password or code before the contents of the SSD storage 404 and/or the SSD control circuitry 406 will be destroyed.

In other embodiments, the initiation of the destruction of the SSD storage 404 and/or the SSD control circuitry 406 can be accomplished externally to the computer device associated with the SSD. As shown in FIG. 4, a centralized command-and-control host 414 can automatically initiate the destruction of the SSD storage 404 and/or the SSD control circuitry 406. The command-and-control host 414 may be configured to automatically issue a destruction command based on a trigger event, e.g. a security breach. In this scenario, certain SSDs, such as those containing extremely sensitive or confidential data, may be destroyed remotely and on-demand. As with the keyboard input embodiment disclosed previously, such an embodiment should be secure from accidental initiation and from access by those with nefarious intent. As such, a secure communications protocol, for example, requiring the use of an encrypted key, is employed to communicate the command from a central command-and-control structure.

While the present disclosure and related concepts have been illustrated by the description of various embodiments thereof, and while these embodiments have been described in considerable detail, it is not the intention of the Applicant to restrict or in any way limit the scope of the appended claims to such detail. Additional advantages and modifications will readily appear to those skilled in the art. Moreover, in some instances, elements described with one embodiment may be readily adapted for use with other embodiments. Therefore, the disclosure, in its broader aspects, is not limited to the specific details, the representative apparatus, and illustrative examples shown and described. Accordingly, departures may be made from such details without departing from the spirit or scope of the general disclosed concepts.

The invention claimed is:

1. A solid-state drive (SSD) destruction system, the system comprising:
   an induction coil proximate to a SSD;
   an energy storage device;
   a switch device that is connected to the induction coil and the energy storage device; and,
   a controller device in communication with the switch device and a communication bus that is between a control circuitry associated with the SSD and a drive controller,
   wherein the controller device is configured to:
      store an association between the SSD and the drive controller, the association including an affiliation between a SSD identifier and a drive controller identifier;
      determine whether the SSD identifier and the drive controller identifier match the stored association; and
      when the SSD identifier and the drive controller identifier do not match the stored association,
         control the switch device to regulate energy discharged from the energy storage device into the induction coil such that heat generated by the discharged energy destroys data stored in the SSD.

2. The SSD destruction system of claim 1, wherein the energy storage device is a capacitor.

3. The SSD destruction system of claim 1, wherein the energy storage device is a rechargeable battery.

4. The SSD destruction system of claim 1, wherein the induction coil is a flat plane induction coil.

5. The SSD destruction system of claim 1, further comprising:
   a second energy storage device;
   a voltage control device operably connected to the second energy storage device and the control circuitry associated with the SSD.

6. The SSD destruction system of claim 5, wherein the controller is in communication with the voltage control device and configured to control the voltage control device to regulate energy discharged from the second energy storage device to the control circuitry associated with the SSD to destroy the control circuitry.

7. The SSD destruction system of claim 1, further comprising a charging circuit configured to provide electric charge to the energy storage device.

8. The SSD destruction system of claim 7, wherein the controller is further configured to verify that a charge stored on the energy storage device is sufficient to destroy data stored in the SSD.

9. A method for automatically destroying a solid-state drive (SSD), the method comprising:
   storing, by a controller, an association between a SSD and a drive controller, the association including an affiliation between a SSD identifier and a drive controller identifier;
   determining, by the controller, whether the SSD identifier and the drive controller identifier match the stored association;
   receiving, by the controller, a SSD destruction command when the SSD identifier and the drive controller identifier do not match the stored association;
   determining, by the controller, a charge level of an energy storage device; and,
   operating, by the controller, a switch device to regulate energy discharge from the energy storage device to an induction coil proximate to a SSD, such that the heat generated by the energy discharge destroys data stored in the SSD.

10. The method of claim 9, wherein the SSD destruction command is received remotely from a centralized command-and-control host.

11. The method of claim 10, wherein the SSD destruction command is generated by the centralized command-and-control host in response to a trigger event.

12. The method of claim 9, wherein the SSD destruction command is received from a local user input command.

13. The method of claim 9, wherein the induction coil is a flat plane induction coil.

14. The method of claim 9, further comprising:
   receiving a control circuitry destruction command;
   determining a charge level of a second energy storage device; and,
   operating a voltage control device to regulate energy discharge from the voltage control device to control circuitry associated with the SSD to destroy the control circuitry.

15. The method of claim 9, wherein the SSD destruction command is received from an enclosure intrusion detection device.

16. A solid-state drive (SSD) destruction system, the system comprising:
   an induction coil proximate to a SSD, the SSD having an enclosure and an enclosure intrusion detection device;
   an energy storage device;
   a switch device that is connected to the induction coil and the energy storage device; and,
   a controller device in communication with the enclosure intrusion detection device, the switch device, and a communication bus that is between a control circuitry associated with the SSD and a drive controller,
   wherein the controller device is configured to store an association between the SSD and the drive controller, the association including an affiliation between a SSD identifier and a drive controller identifier; and
   wherein when the enclosure intrusion detection device detects an intrusion of the SSD enclosure, the controller device is further configured to:
      determine whether the SSD identifier and the drive controller identifier match the stored association; and
      control the switch device to regulate energy discharged from the energy storage device into the induction coil when the SSD identifier and the drive controller identifier do not match the stored association such that heat generated by the discharged energy destroys data stored in the SSD.

17. The SSD destruction system of claim 16, wherein the energy storage device is a capacitor.

18. The SSD destruction system of claim 16, wherein the energy storage device is a rechargeable battery.

19. The SSD destruction system of claim 16, wherein the induction coil is a flat plane induction coil.

20. The SSD destruction system of claim 16, further comprising:
   a second energy storage device;
   a voltage control device operably connected to the second energy storage device and the control circuitry associated with the SSD.

* * * * *